Aug. 8, 1933.   A. W. PRIEBE   1,921,242
SCARF FOR ELECTRIC ARC WELDING THICK METAL ARTICLES
Filed Jan. 25, 1932
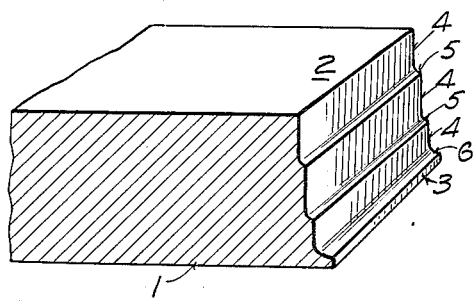
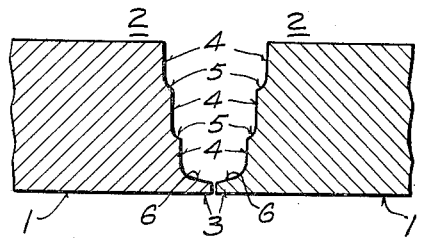
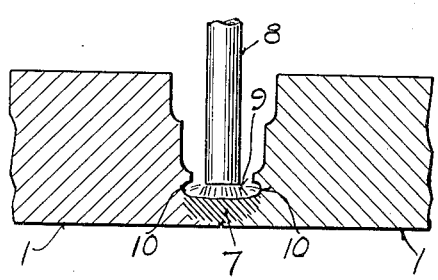
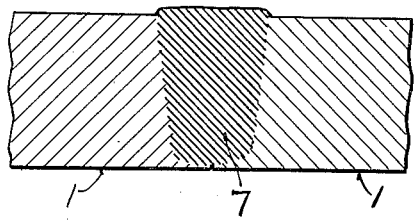
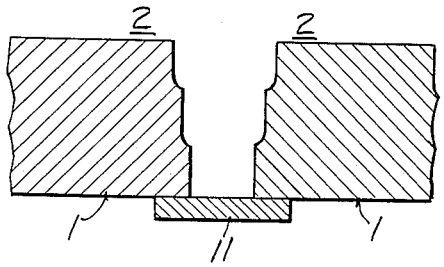
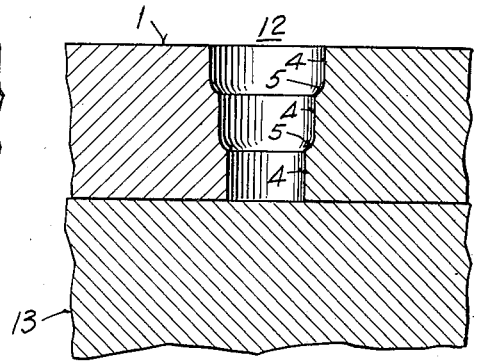
INVENTOR.
Arthur W. Priebe
BY
ATTORNEY.

Patented Aug. 8, 1933

1,921,242

UNITED STATES PATENT OFFICE 1,921,242

SCARF FOR ELECTRIC ARC WELDING THICK METAL ARTICLES

Arthur W. Priebe, Milwaukee, Wis., assignor to A. O. Smith Corporation, Milwaukee, Wis., a Corporation of New York Application January 25, 1932. Serial No. 588,561

6 Claims. (Cl. 219—10)

This invention relates to scarfs for electric arc welding thick metal articles.

In welding thick metal articles by the electric arc process, a certain amount of fusion of the metal forming the side walls of the welding groove is desirable in order to effect a thorough union between the article and the deposited weld metal. But where the side walls of the groove are very steeply inclined, it is difficult for the operator to prevent the arc and fusing weld metal from melting deeply into the side wall and forming excessive undercuts. After an undercut has been formed, it is necessary to continue burning into the side wall at that place when successive layers of weld metal are deposited to melt the metal overhanging the cavity undercut and to prevent the entrapping of slag. With the straight or curved side walls heretofore provided, it required a great amount of burning to bring an undercut smoothly to the surface without slag inclusions. As a result, the undercuts sometimes spoiled welds and made the process of welding difficult to practice.

It is the object of the invention to provide for bringing to the surface undercuts made by an arc while welding in deep steep-sided grooves in thick metal articles.

The accompanying drawing illustrates embodiments of the invention, in which:

Figure 1 is a view in perspective of a thick metal plate scarfed in accordance with the invention;

Fig. 2 is a view in section of two thick metal plates scarfed in accordance with the invention and placed in spaced opposed relation to form a welding groove;

Fig. 3 is a view similar to Fig. 2 showing a layer of weld metal deposited in the welding groove;

Fig. 4 is a view similar to Fig. 2 showing the welding groove completely filled with weld metal;

Fig. 5 is a view in section of two metal plates scarfed in accordance with the invention and placed in spaced opposed relation for welding, a backing strip bridging the gap between them to form the bottom of a welding groove; and Fig. 6 is a view in cross section of a thick metal plate having a hole provided therein suitable for making a plug weld, the walls defining the perforation being scarfed in accordance with the invention.

Referring to the drawing, Fig. 1 illustrates a thick metal plate 1 having its end 2 scarfed to form the side of a welding groove. The scarfed end 2 comprises a projecting lip 3 extending along the lower edge of the plate 1, a plurality of wall sections 4 one above the other and successively offset into the metal of the plate 1 with ledges 5 connecting successive wall sections, and a rounded portion 6 which joins the lip 3 with the lowest wall section 4 and presents the entire surface of the scarf directly to the action of the electric arc during the welding operation.

In order to weld two scarfed plates such as shown in Fig. 1, the scarfed ends 2 are disposed in opposed relation with the projecting lips 3 approximately in contact, forming a welding groove. Weld metal 7 may be deposited in the groove from a metallic electrode 8, fusing the scarfed ends of the plates in the manner shown in Fig. 3. The arc 9 and fusing weld metal 7 melt the metal of the plates 1 in a manner forming cavities or undercuts 10 in the wall sections 4.

As successive layers of weld metal 7 are deposited in the groove, variations in the heat of the arc 9 and deviations of the electrode from the proper course within the groove frequently cause these cavities or undercuts 10 to increase in depth to such an extent that should they not be reduced in size in some way, slag would become entrapped in them, greatly to the detriment of the strength of the weld.

The applicant prevents the undercuts from becoming excessively deep by providing ledges or offsets 5 between adjacent wall sections 4. As the walls overhanging the undercuts 10 are melted upward in the wall sections 4 in the process of depositing successive layers of weld metal 7, the undercuts are extended toward the ledges or offsets 5 and excessive undercuts are there brought to the surface or burned out.

The ledges or offsets 5 are preferably made shallow and downwardly sloping so that the weld metal 7 may not, by flooding over them, cause slag inclusions in the reentrant angle between the ledges 5 and wall sections 4 above.

In the embodiment of the invention shown in Fig. 5 the invention is applied to two thick metal plates 1 where, instead of projecting lips, a backing strip 11 is provided to bridge the gap between the lower edges of the scarfed ends 2 for forming a welding groove.

The invention may be applied to the walls defining a circular perforation 12 in a thick metal plate 1 for making a plug weld upon a second plate 13 as illustrated in Fig. 6. In this case the circular perforation 12 increases in diameter from bottom to top in successive steps, whereby cylindrical wall sections 4 and connecting circular offsets 5 are provided for the purpose of bringing undercuts to the surface in the same manner as described above.

The invention is not limited to the uniting of two metal plates, nor to welding grooves in which the opposed scarfed ends are symmetrically formed, but may be applied to any articles having steep sided welding grooves. It may be applied to a circumferential seam between two heavy walled tubes, or to a groove between a tube and a flange, or to a groove between two castings of regular or irregular shape. Other examples will suggest themselves to one skilled in the art.

While the principle of the invention has been described in detail as applied to the above embodiments, various modifications may be made without departing from the scope of the appended claims.

I claim:

1. A scarf for welding metal articles comprising a plurality of wall sections one above the other, and ledges between adjacent wall sections, the ledges facilitating the opening of undercuts formed during the process of welding.

2. In a scarf for a trick metal article to be welded suitable for forming part of a steep sided welding groove adapted to receive a plurality of layers of weld metal, in combination, a plurality of elongate wall sections for receiving weld metal, the lower edges of said wall sections being offset into the metal of the articles with respect to the upper edge of the adjacent wall section below, and connecting sections between adjacent wall sections forming downwardly sloping ledges.

3. A scarf for welding metal articles comprising, a plurality of independent wall sections one above the other, and connective offset surfaces between adjacent wall sections, said offsets being sufficiently deep to bring excessive under cuts formed during the process of welding substantially to the surface.

4. In a thick metal article to be electric arc welded, a steeply inclined side wall portion of a scarf for forming a deep welding groove for receiving a plurality of layers of weld metal comprising, a plurality of elongate wall sections one above the other, the lower edge of each wall section being offset into the metal of the article from the upper edge of the adjacent wall section below an amount sufficient to bring to the surface excessive undercut that may be made in the wall sections by the electric arc during the welding operation, and connective ledge sections between adjacent wall sections inclined downwardly an amount sufficient to prevent flooding of the ledges by the layers of weld metal during the welding operation.

5. A scarf for metal articles suitable for forming a welding groove comprising a lip extending horizontally outwardly to form a portion of the bottom of the welding groove, a wall rising above said lip and having its upper portion steeply inclined to the lip for forming a slightly divergent side wall of the welding groove, and offsets in the steeply inclined portion of the wall extending longitudinally of the scarf to give a stepped configuration thereto for opening undercuts made by the arc during the welding operation.

6. A scarf for welding thick metal articles comprising, a projecting lip extending along the lower edge of the scarfed portion of the metal article for forming the bottom of a welding groove, a plurality of wall sections one above the other and steeply inclined to the projecting lip, a rounded portion connecting the projecting lip and the wall section adjacent thereto, and offsets connecting adjacent wall sections.

ARTHUR W. PRIEBE.